July 10, 1945.   O. C. KAVLE   2,380,314
AUTOMATIC WORK FEEDING ATTACHMENT FOR DRILL PRESSES
Filed Aug. 13, 1942   2 Sheets-Sheet 1

INVENTOR.
O. C. Kavle
BY
Bodell & Thompson
ATTORNEYS.

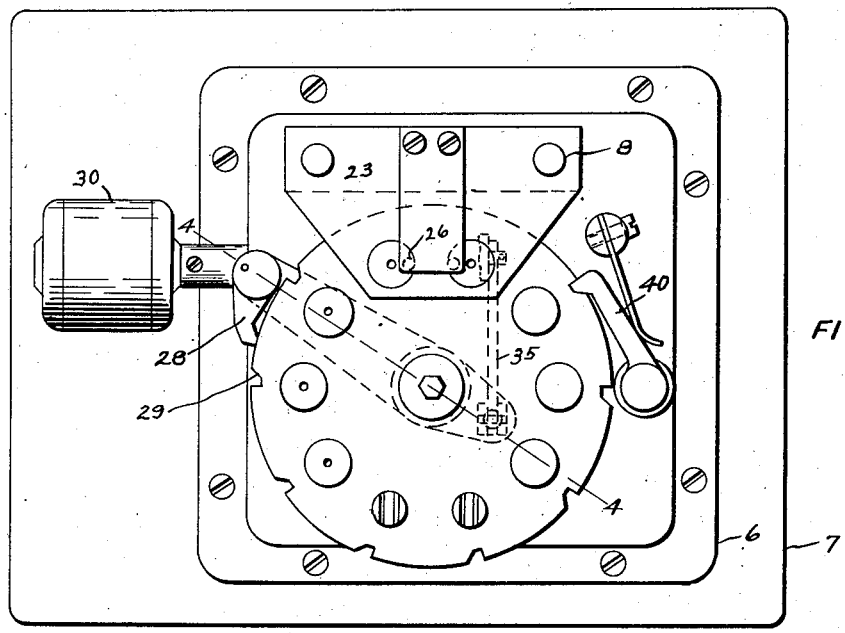
FIG. 3
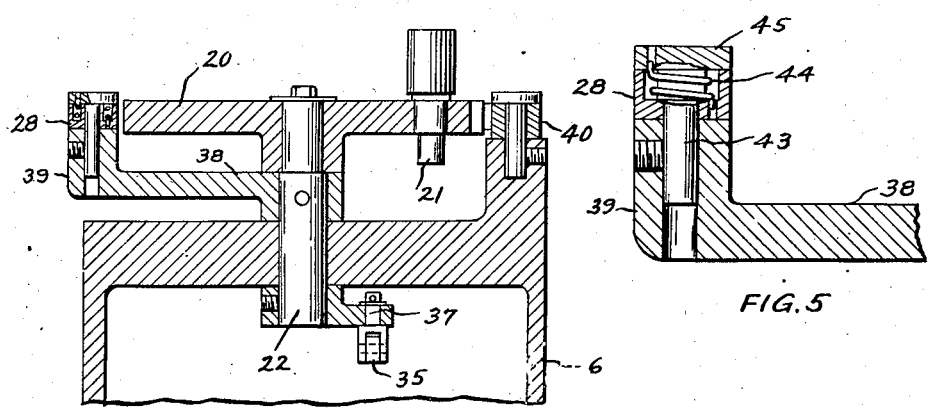
FIG. 4
FIG. 5

Patented July 10, 1945

2,380,314

UNITED STATES PATENT OFFICE 2,380,314

AUTOMATIC WORK FEEDING ATTACHMENT FOR DRILL PRESSES

Oscar C. Kavle, Syracuse, N. Y., assignor to The Kavle-Head Corporation, Ithaca, N. Y., a corporation of New York Application August 13, 1942, Serial No. 454,717

1 Claim. (Cl. 77—22)

This invention has for its object an automatic work feeding attachment for drill presses, by which the operator merely places the work-pieces on a work carriage and removes the finished work therefrom, and the carriage is automatically actuated to carry the work-pieces successively to the tool and in which work holders carried by the carriage are automatically moved to carry the work to and from the tool when in line therewith.

The invention has further for its object such an attachment which can readily be attached to the head or quill of a drill press.

Other objects appear throughout the specification.

The invention consists in the novel features and in the combinations and constructions hereinafter set forth and claimed.

In describing this invention, reference is had to the accompanying drawings, in which like characters designate corresponding parts in all the views.

Figure 3 is a plan view of the frame and base of the attachment.

Figure 4 is a sectional view taken approximately on line 4—4, Figure 3, parts being omitted.

Figure 5 is an enlarged fragmentary sectional view of the pivot and contiguous parts for the indexing pawl shown in Figures 3 and 4.

Figures 1, 2, 6:
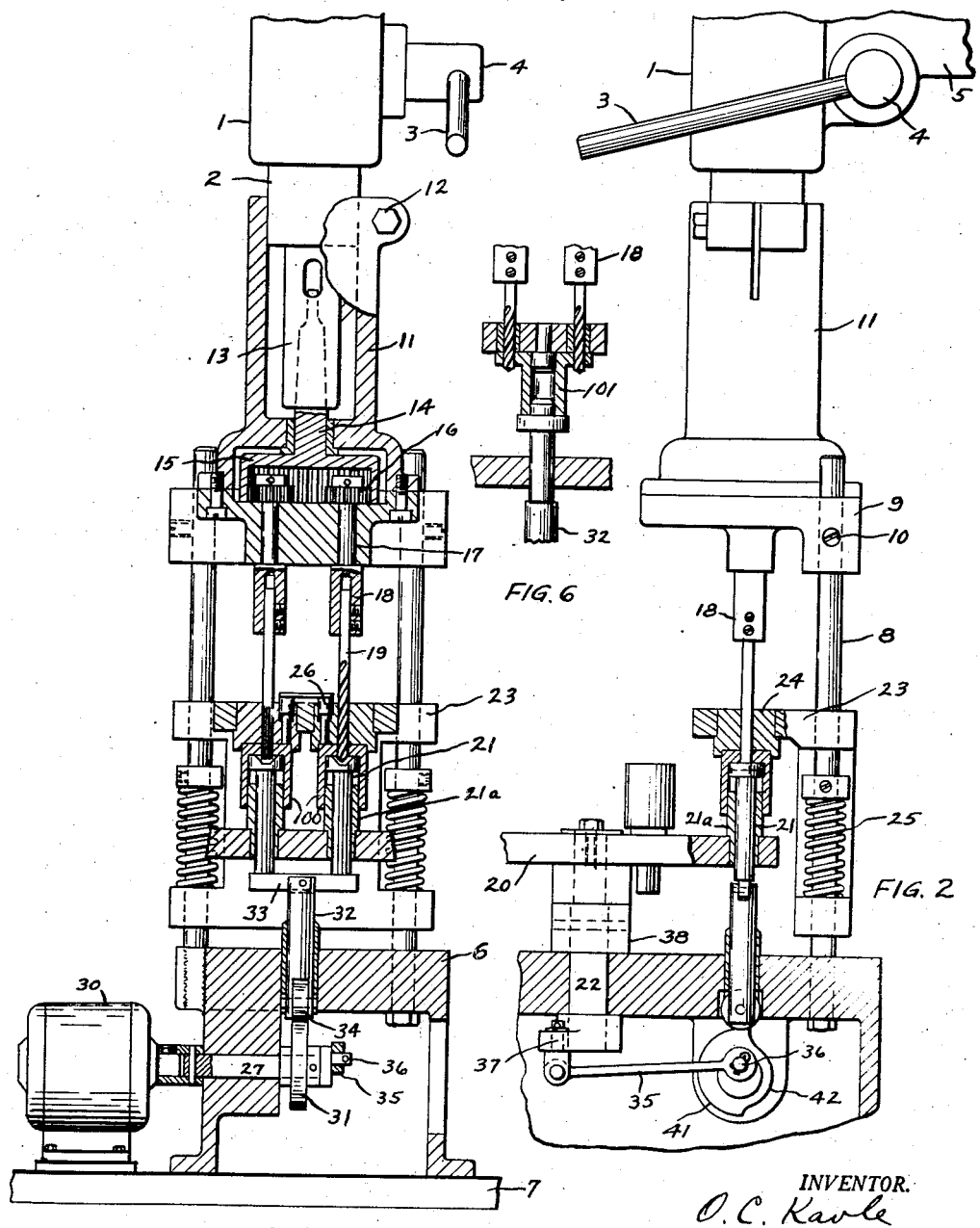
Figure 1 is a longitudinal sectional view through this attachment, contiguous portions of the drill press being also shown.
Figure 2 is an elevation looking to the left in Figure 1.
Figure 6 is a fragmentary view illustrating a slightly modified tool arrangement from that shown in Figure 1.

This automatic work feeding attachment for drill presses comprises, generally, a base mountable upon the table of a drill press, a work carriage, as a turret, rotatably mounted on the base and having a series of vertically movable work holders mounted therein and movable to carry the work toward and from the tool, a frame mounted on the base and having a head provided with means for attachment to the quill of the drill press, an abutment carried by the frame and against which the work is fed by the holders, the head having means for rotatably supporting the tool and holding it from axial movement, means for transferring the rotary movement of the spindle of the drill press to the tool, and means for intermittently actuating and indexing the work carriage to bring the work holders successively in line with the tool and for reciprocating and timing the operation of the holders in line with the tool to feed the work to and from the tool. The invention also includes strippers for stripping the work off from the tool during downward or retrograde movement of the work holder.

1 designates the head of a drill press having the usual quill 2. The head is adjustable up and down in any well known manner, as by a lever 3 on a rock shaft 4. As is well known, the rock shaft is journalled in an overhanging bracket 5 of the press and has a pinion which meshes with a rack on the head 1. The lever 3 in the drill press is usually used to feed the head and the drill or tool up and down or from and to the work on the drill press table.

6 designates the base of the attachment, this being mounted on a plate 7, which in turn may be secured to the table. 8 designates a frame rising from the base, this consisting of two standards or rods, and 9 is a head carried at the upper ends of the rods and adjustable along the same, the head being secured in any adjusted position, as by set screws 10. The head includes a part, as a sleeve 11, having split clamp means 12 at its upper end for securement to the quill 2 of the drill press. This head also comprises means by which the rotary motion of the spindle 13 of the drill press is transferred to the tool or tools. In the illustrated embodiment of the invention, two tools are shown, and the means for transferring the motion of the spindle 13 to the tools is of the multiple type consisting of a shank 14 having an annular head 15 having internal gear teeth meshing with pinions 16 on spindles 17 mounted in the head, these spindles being provided with chucks or sockets 18 for receiving the tools 19.

20 designates the work carriage here shown as a turret, movable about a horizontal axis and provided with an annular series of work holders, as plungers 21, movable upwardly or parallel to the axis of rotation of the carriage 20 in guides 21ª. The carriage 20 is mounted about an upright shaft 22 above the base 6 and extending through the base 6 for connection to indexing mechanism, which intermittently actuates the carriage. 23 designates a carriage mounted on the frame or the rods 8 and having abutments 24 against which the work-pieces are held during the machining operation. The tools 19 extend through the abutments 24. Spring means is provided for applying yielding pressure between the work-piece 100 and the abutment. As here illustrated, the carriage 23 is yieldingly mounted on the frame or rods 8 to yield against the pressure of springs 25, as the work-pieces 100 are lifted by the plungers 21 and fed to the tools 19.

26 designates spring-pressed strippers, one for each abutment 24 for pressing the work-piece away from the abutment during downward or retrograde movement of the plungers 21. Owing to the pressure of the springs 25, the work-pieces are held from rotation with the tool, by reason of their frictional engagement with the abutment. The plungers are provided with suitable clearances or depressions for the ends of the tools, after the tools have cut through the work-piece. In Figure 1, one tool is shown, as a drill, and the other as a reamer. In Figure 6, both tools are shown as drills operating on one work-piece 101. Thus, the tools may be of the same or of different character.

In the form shown in Figure 1, the indexing mechanism is such that the work carriage 20, when fed one step, carries the work-piece 100 under the drill and the work-piece 100 that was previously under the drill under the reamer. In the form shown in Figure 6, the indexing mechanism will be of such extent as to carry the work-piece 101 under the two drills during each intermittent action.

The means for actuating and indexing the work carriage 20 may be of any suitable construction and includes a motor actuated shaft 27 mounted in the base 6, motion transmitting means between this shaft and the plungers or work holders 21 positioned in line with or in juxtaposition to the tool or tools 19, and also motion transmitting mechanism between the shaft 27 and an indexing pawl 28 coacting with notches 29 formed in the periphery of the carriage or turret 20.

30 designates the motor, which is connected to the shaft 27, it being here shown as connected directly thereto but may be connected thereto through reduction gearing. The motion transmitting means between the shaft 27 and the work holders or plungers 21 in juxtaposition to the tools includes a cam 31 mounted on the shaft 27 within the base 6 and a plunger 32 having a head 33 for thrusting against the lower ends of the plungers 21 in juxtaposition to the tools. The plunger 32 extends through a suitable guide in the base 6 to above the same and is provided with a follower, as a roller 34, at its lower end for coacting with the cam 31. The motion transmitting means between the shaft 27 and the indexing pawl 28 is here shown as a connecting rod 35 mounted at one end on the crank at 36 at the inner end of the shaft 27 and its other end at 37 to a rock arm on the shaft 22 extending through the base 6 coaxially with the work carriage or turret, an arm 38 mounted on the rock shaft and extending radially relatively to the carriage 20 and having an upwardly extending arm 39 at its outer end extending crosswise of the periphery of the carriage 20 and on which is mounted the pawl 28. The indexing mechanism further includes a spring-pressed stop pawl 40 for coacting with any one of the notches 29 after the carriage 20 has been indexed. The cam 31 is of such form, as seen in Figure 2, that the plungers in juxtaposition to the tools are lifted quickly against the abutment 24 and held against the same while a high dwell surface 41 of the cam is coacting with the follower 34. During this period, the connecting rod 35 is moving the pawl 28 in a retrograde direction from a point between two of the notches 29, that is, to the right in Figure 2, and enters the notch at the end of its throw, then reverses and feeds the carriage one step, and then returns it to its position between two of the notches. When the carriage has been fed one step, the pawl 40 enters another of the notches and holds the carriage in its indexed position. While the carriage is indexing, the follower is coacting with the low surface 42 of the cam. The lifts and drops between the low and high surfaces 41 and 42 of the cam are abrupt or steep to effect quick lifting of the work holders 21 against the abutments 24 and a quick return of the work holders away from this position to retraced position.

When the two tools are of different character, as a drill and a reamer, as shown in Figure 1, the throw of the pawl 28 and the spacing of the notches 29 is such as to feed one work holder or plunger under the drill upon one operation, and then feed that work holder or plunger under the reamer, and another work holder or plunger under the drill upon the next operation.

The pawl 28 is here shown as mounted upon a pin 43 extending into the upwardly extending arm 39 and being cupped out to receive a spring 44 coiled about the pin and anchored at one end in the bottom of the cup-shaped part and at its other end to a cap 45 secured to the pin 43.

In the general operation, the base 6 is secured to the table of the drill press and the head 11 to the quill and also adjusted to the desired height along the frame or rods 8. As the turret rotates, the finished work is removed and the new work placed on the holder 21, as these holders move around to the operator during the indexing operation and the new work carried to the tools and the tooling operations performed automatically.

What I claim is:

The combination with a machine having an overhanging upright quill, a work table, and a rotating spindle extending vertically of the quill beyond the lower end of the same, of a multiple tool unit including a frame having a head provided with a sleeve portion and enclosing the lower end of the quill and secured thereto and also enclosing the spindle, a base mountable on the table and on which base the frame is supported, multiple drill supporting and driving mechanism mounted within the head and including a shank for attachment to the spindle, whereby said mechanism is actuated by the spindle, the frame including a work support, means carried by the frame for indexing the work support, and means carried by the base and the frame as a unit therewith for effecting relative axial movement of the work support and the drill actuating mechanism.

OSCAR C. KAVLE.